(12) United States Patent
Dohring et al.

(10) Patent No.: US 8,784,108 B2
(45) Date of Patent: *Jul. 22, 2014

(54) COMPUTER-BASED LANGUAGE IMMERSION TEACHING FOR YOUNG LEARNERS

(75) Inventors: Doug Dohring, Glendale, CA (US); David Hendry, La Crescenta, CA (US); Stephanie Yost, Glendale, CA (US); Jerry Chiawei Chen, Saratoga, CA (US)

(73) Assignee: Age of Learning, Inc., Glendale, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/301,660

(22) Filed: Nov. 21, 2011

(65) Prior Publication Data

US 2013/0130211 A1   May 23, 2013

(51) Int. Cl.
*G09B 19/06* (2006.01)

(52) U.S. Cl.
CPC ..................................... *G09B 19/06* (2013.01)
USPC ........................................... 434/157; 434/156

(58) Field of Classification Search
USPC .......................... 434/157, 322–323, 350–365
See application file for complete search history.

(56) References Cited

U.S. PATENT DOCUMENTS

| | | | |
|---|---|---|---|
| 5,429,513 A | 7/1995 | Diaz-Plaza | |
| 6,331,115 B1 | 12/2001 | Jenkins et al. | |
| 6,604,947 B1 | 8/2003 | Rai | |
| 7,200,581 B2 | 4/2007 | Taggart et al. | |
| 7,421,391 B1 | 9/2008 | Merkel | |
| 7,524,191 B2 | 4/2009 | Marmorstein et al. | |
| 2002/0029146 A1 | 3/2002 | Nir | |
| 2002/0094511 A1 | 7/2002 | Li | |
| 2002/0160341 A1 | 10/2002 | Yamada et al. | |
| 2004/0152054 A1 | 8/2004 | Gleissner et al. | |
| 2005/0048449 A1* | 3/2005 | Marmorstein et al. | 434/157 |
| 2005/0052405 A1* | 3/2005 | Maulik et al. | 345/156 |

(Continued)

FOREIGN PATENT DOCUMENTS

| JP | 2001-337595 | 12/2001 |
|---|---|---|
| KR | 10-2002-0045757 | 6/2002 |

(Continued)

OTHER PUBLICATIONS

Levis J. et al., "Integrating Pronunciation into ESL/EFL Classrooms," TESOL Journal, vol. 12, No. 2, pp. 13-19.

(Continued)

*Primary Examiner* — Robert J Utama
*Assistant Examiner* — Sadaruz Zaman
(74) *Attorney, Agent, or Firm* — Wilson Sonsini Goodrich & Rosati

(57) ABSTRACT

Disclosed herein, in certain embodiments, are computer-based language immersion teaching systems, products, programs, and methods for learners aged about 3 to about 10 years comprising a digital processing device and a computer program that creates a language immersion teaching environment, wherein said environment comprises a plurality of learning activities associated with a target language, and wherein said plurality of activities comprises: at least one learning activity based on a taxonomy of phonemes; at least one learning activity selected from: songs, chants, books, poems, puzzles, games, art activities, and printable activities; voiceover audio in said target language; and a software module for recording said learner's pronunciation and comparing it to one or more model pronunciations.

20 Claims, 7 Drawing Sheets

(56) References Cited

U.S. PATENT DOCUMENTS

| | | |
|---|---|---|
| 2006/0073462 A1* | 4/2006 | Tetreault .................. 434/322 |
| 2006/0093996 A1 | 5/2006 | Goldman et al. |
| 2007/0048699 A1 | 3/2007 | MacGregor et al. |
| 2007/0099158 A1 | 5/2007 | Moran et al. |
| 2007/0224578 A1 | 9/2007 | De Ley et al. |
| 2008/0070203 A1* | 3/2008 | Franzblau .................. 434/157 |
| 2008/0077388 A1 | 3/2008 | Nash et al. |
| 2008/0160487 A1 | 7/2008 | Fairfield et al. |
| 2008/0182230 A1 | 7/2008 | Stone |
| 2008/0206724 A1 | 8/2008 | Volden |
| 2008/0280269 A1 | 11/2008 | Yeung et al. |
| 2008/0294433 A1 | 11/2008 | Yeung et al. |
| 2009/0061398 A1 | 3/2009 | Keim et al. |
| 2009/0098524 A1 | 4/2009 | Walton |
| 2009/0204406 A1 | 8/2009 | Keim et al. |
| 2009/0307203 A1 | 12/2009 | Keim et al. |
| 2009/0317776 A1 | 12/2009 | Keim et al. |
| 2010/0081115 A1 | 4/2010 | Harding et al. |
| 2010/0143873 A1 | 6/2010 | Keim et al. |
| 2010/0143874 A1 | 6/2010 | Keim et al. |
| 2010/0248194 A1 | 9/2010 | Renduchintala et al. |
| 2010/0323332 A1 | 12/2010 | Keim et al. |
| 2011/0014595 A1 | 1/2011 | Birr |
| 2011/0027762 A1 | 2/2011 | Keim et al. |
| 2011/0053123 A1* | 3/2011 | Lonsdale .................. 434/157 |
| 2011/0065082 A1 | 3/2011 | Gal et al. |
| 2011/0104646 A1 | 5/2011 | Harte |
| 2012/0164609 A1 | 6/2012 | Kehoe |
| 2013/0059276 A1* | 3/2013 | Allen et al. .................. 434/167 |
| 2013/0130210 A1 | 5/2013 | Dohring et al. |
| 2013/0130212 A1 | 5/2013 | Dohring et al. |

FOREIGN PATENT DOCUMENTS

| | | |
|---|---|---|
| KR | 10-2003-0049791 | 6/2003 |
| KR | 10-2004-0065593 | 7/2004 |
| KR | 10-0791024 | 1/2008 |
| KR | 10-2009-0089504 | 8/2009 |

OTHER PUBLICATIONS

Rosetta Stone, http://www.rosettastone.com/schools, Accessed Mar. 3, 2011.
U.S. Appl. No. 13/301,668 Final Action dated May 21, 2013.
U.S. Appl. No. 13/301,668 Office Action dated Jan. 25, 2013.
U.S. Appl. No. 13/301,639 Final Action dated Apr. 19, 2013.
U.S. Appl. No. 13/301,639 Office Action dated Nov. 7, 2012.
PCT/US2012/065917 International Search Report dated May 24, 2013.
Tell Me More, http://www.tellmemore.com/, Accessed Mar. 3, 2011.
Cocinella, http://www.3dlanguage.net/, Accessed Mar. 3, 2011.
eBerlitz. http://www.berlitz.us/, Accessed Mar. 3, 2011.
Scientifice Learning Progress Tracker, http://www.scilearn.com/products/fast-forward-language-series/, Accessed Mar. 3, 2011.
Byki Software, http://www.transparent.com/education/byki-online.html, Accessed Mar. 3, 2011.
Babbel Learning, http://www.babbel.com/, Accessed Mar. 3, 2011.
Mango Languages, http://www.mangolanguages.com/, Accessed Mar. 3, 2011.

* cited by examiner

COMPUTER-BASED LANGUAGE IMMERSION TEACHING FOR YOUNG LEARNERS

BACKGROUND OF THE INVENTION

Interest in and support for language study has strengthened in recent years due to the growing recognition that proficiency in more than one language benefits both individual learners and society. For the individual language learner, research has found a positive link between second language proficiency and cognitive and academic ability. In addition to developing a lifelong ability to communicate with people from other countries and backgrounds, individual benefits include improved overall school performance, superior problem-solving skills, and enhanced creativity and cognitive flexibility. Bamford, K. W., et al. (1991). Additive-bilingual (immersion) education: Cognitive and language development. Language Learning, 41:413-429; Hakuta, K. (1986). Mirror of language. New York: Basic Books.

From a societal perspective, a multilingual workforce enhances economic competitiveness and promotes tolerance and intercultural awareness. Americans fluent in other languages improve global communication and enhance U.S. economic competitiveness abroad. Center for Applied Linguistics (2004): Why, How, and When Should My Child Learn a Second, available at http://www.cal.org/resources/pubs/whyhowwhen_brochure.pdf. As a result, students of foreign languages often have better career opportunities. This is especially true for those learning English as an additional or foreign language. While English is the third most natively spoken language in the world, after Mandarin Chinese and Spanish, English has become the leading language of international discourse, including business and scientific discourse, and has acquired use as lingua franca in many regions. Crystal, D. (1997). English as a Global Language. Cambridge: Cambridge University Press; Wardhaugh, R. (2006). An introduction to sociolinguistics. Wiley-Blackwell.

SUMMARY OF THE INVENTION

Learning a language at any age is beneficial; however, many studies indicate that young learners are more open to linguistic development and are more likely to develop pronunciation similar to native speakers. Newport, E. L. (2004). Maturational constraints on language learning. Cognitive Science, 14(1):11-28. For young learners, engagement, or the degree of involvement, contribution, and ownership that an individual has with regard to an experience, is critical to success. The more engaged a young learner is with a learning activity, the more likely he/she is to assimilate the activity's educational content. An effective language immersion teaching environment for young learners should include features designed to engage children at a high level, including different types of activities, such as songs, chants, books, poems, puzzles, games, art activities, and printable activities, which offer variety and support a wide range of learning styles.

Phonemes are the abstract units of a language that correspond to a set of similar speech sounds which are perceived to be a single distinctive sound in the language. Awareness of the phonemes of a new language, their sounds, and their use in constructing and deconstructing words are the base skills required for learning first (e.g., native) and additional (e.g., second, additional, or foreign) languages. Therefore, an effective language immersion teaching environment for young learners should introduce the phonemes of a target language and offer an organization, such as a taxonomy, to help learners access, navigate, and remember the phonemes. Moreover, an effective language immersion teaching environment for young learners should focus on the sounds of phonemes and provide practice recognizing the phonemes and their sounds within the beginning, middle, and end of words, and joining the sounds to form words as well as breaking words down into phonemes. Additionally, an effective language immersion teaching environment for young learners should provide voiceover audio in a target language to demonstrate the phonemes and their proper pronunciation and should provide practice pronouncing phonemes and words in a way that allows learners to compare their pronunciations to model pronunciations by a native speaker.

Technology is an increasingly influential factor in education and offers new opportunities to create powerful learning tools. Multimedia technology provides new ways to engage students, such as through the creation of an interactive language immersion teaching environment. In such an environment, learners can enjoy flexibility to choose from among diverse learning activities. This helps to address multiple learning styles, as well as keep the learning experience engaging. Multimedia technology also provides new ways to model phonemes, phonemes in the context of words, vocabulary, sentence structures, and common conversational patterns as well as new ways to facilitate learner practice and evaluation, such as voice recording. Despite these potentials, current computer-based language immersion teaching environments do not include all of the features necessary to effectively engage children; especially young children aged about 3 to about 10. Moreover, current computer-based environments do not provide adequate focus on the phonemes of a target language. Specifically, they do not offer engaging learning activities based on a taxonomy of phonemes, where the phonemes are modeled, alone and in the context of words, by voiceover audio, with opportunity for learners to evaluate their own pronunciations.

Disclosed herein, in certain embodiments, are computer-based language immersion teaching systems for learners aged about 3 to about 10 years comprising: a digital processing device that is optionally connected to a computer network, wherein said processing device comprises an operating system configured to perform executable instructions; and a computer program, provided to said digital processing device, including executable instructions that create a language immersion teaching environment, wherein said environment comprises a plurality of learning activities associated with a target language; wherein said plurality of activities comprises: at least one learning activity based on a taxonomy of phonemes; at least one learning activity selected from: songs, chants, books, poems, puzzles, games, art activities, and printable activities; voiceover audio in said target language; and a software module for recording said learner's pronunciation and comparing it to one or more model pronunciations. In some embodiments, the learning activities are organized according to an instructional plan based on a taxonomy of phonemes of said target language, wherein said instructional plan is designed to accomplish one or more specific educational objectives in said target language. In further embodiments, said organization creates a progression of educational objectives comprising teaching phoneme sounds, phoneme sounds in the context of the beginning, middle, and end of words, word families, vocabulary in the context of environments or themes, sentence structures, and common conversational patterns. In some embodiments, the taxonomy of phonemes includes phonemes represented by a single letter and phonemes represented by one or more combinations of letters. In some embodiments, the taxonomy of phonemes includes phonemes represented by an image. In some embodiments, the plurality of learning activities includes activities designed to accomplish one or more educational objectives related to: teaching sounds of phonemes and teaching phonemes in the context of the beginning, middle, and end of words; teaching one or more word families; teaching vocabulary in the context of a particular environment or theme; teaching sentence structures; and teaching common conversational patterns. In some embodiments, the software module for recording said learner's pronunciation and comparing it to one or more model pronunciations is configured to provide visual feedback in the form of waveform analysis and/or a pronunciation score. In some embodiments, the system further comprises a software module for translation of voiceover and/or text from said target language to a specified language. In further embodiments, the software module for translation of voiceover and/or text is adapted to facilitate said mentor in furthering the educational development of said learner. In still further embodiments, access to the software module for providing translation of voiceover and/or text is regulated by said mentor. In still further embodiments, the specified language is selected by said mentor. In some embodiments, the system further comprises a software module for monitoring the progress of each said learner, wherein said module reports one or more of: activities completed, educational objectives achieved, and progress within the overall instructional plan. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer readable media encoded with a computer program including instructions executable by the operating system of a digital processing device, wherein said instructions create a language immersion teaching environment for learners aged about 3 to about 10 years, wherein said environment comprises a plurality of learning activities associated with a target language; wherein said plurality of activities comprises: at least one learning activity based on a taxonomy of phonemes; at least one learning activity selected from: songs, chants, books, poems, puzzles, games, art activities, and printable activities; voiceover audio in said target language; and a software module for recording said learner's pronunciation and comparing it to one or more model pronunciations. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer-implemented language immersion teaching methods for learners aged about 3 to about 10 years comprising the step of providing executable instructions to a digital processing device comprising an operating system configured to perform executable instructions, to create a language immersion teaching environment, wherein said environment comprises: a plurality of learning activities associated with a target language, wherein at least one learning activity is based on a taxonomy of phonemes, wherein at least one learning activity selected from: songs, chants, books, poems, puzzles, games, art activities, and printable activities; an instructional plan organizing said activities, wherein said organization creates a progression of educational objectives comprising teaching phoneme sounds, phonemes in the context of the beginning, middle, and end of words, word families, vocabulary in the context of environments or themes, sentence structures, and common conversational patterns; voiceover audio in said target language; and a software module for recording said learner's pronunciation and comparing it to one or more model pronunciations. In some embodiments, the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

DETAILED DESCRIPTION OF THE INVENTION

Figure 1:
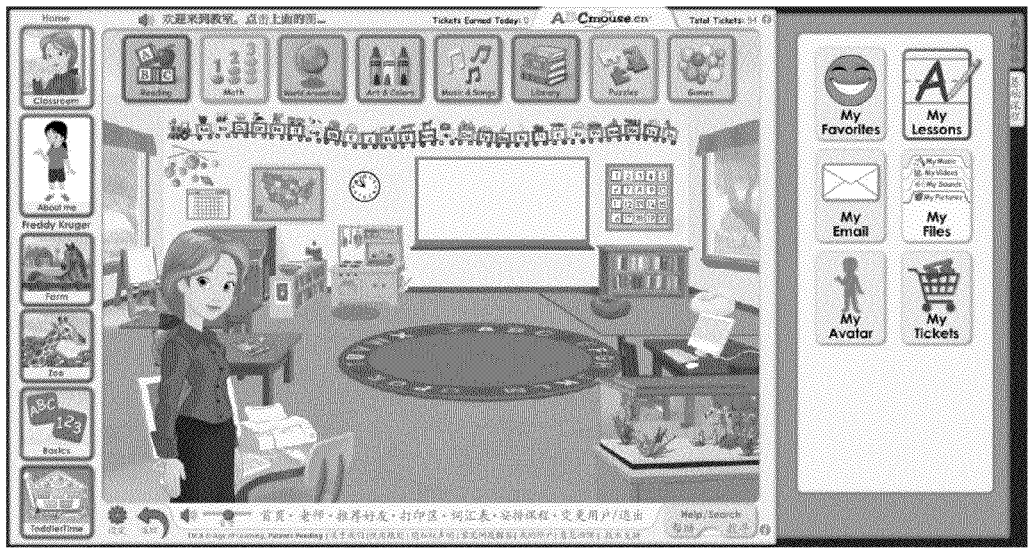
FIG. 1 shows a non-limiting example of a language immersion teaching environment; in this case, an environment representing the metaphor of a classroom and providing access to a plurality of learning activities associated with a target language.

Existing computer-based language immersion teaching environments fail to adequately engage young learners with educational content and fail to adequately model the phonemes of target languages and organize activities around phonemes. Thus, a primary objective of the systems, products, programs, and methods for language immersion teaching described herein is to create a language teaching environment that engages young learners with diverse learning activities that support a wide range of learning styles and employ learning modes frequently at play in native language acquisition. Another objective of the systems, products, programs, and methods disclosed herein is to offer an organization, such as a taxonomy, to help learners access, navigate, and remember the phonemes of a target language. Yet another objective of the systems, products, programs, and methods disclosed herein is to provide a rich variety of learning activities that are based on a taxonomy of phonemes. Yet another objective is to provide voiceover audio in a target language to demonstrate the phonemes and their proper pronunciation and provide practice pronouncing phonemes and words in a way that allows learners to compare their pronunciations to model pronunciations by a native speaker.

Disclosed herein, in various embodiments, are computer-based language immersion teaching systems for learners aged about 3 to about 10 years comprising: a digital processing device that is optionally connected to a computer network, wherein said processing device comprises an operating system configured to perform executable instructions; and a computer program, provided to said digital processing device, including executable instructions that create a language immersion teaching environment, wherein said environment comprises a plurality of learning activities associated with a target language; wherein said plurality of activities comprises: at least one learning activity based on a taxonomy of phonemes; at least one learning activity selected from: songs, chants, books, poems, puzzles, games, art activities, and printable activities; voiceover audio in said target language; and a software module for recording said learner's pronunciation and comparing it to one or more model pronunciations.

Also disclosed herein, in various embodiments, are computer readable media encoded with a computer program including instructions executable by the operating system of a digital processing device, wherein said instructions create a language immersion teaching environment for learners aged about 3 to about 10 years, wherein said environment comprises a plurality of learning activities associated with a target language; wherein said plurality of activities comprises: at least one learning activity based on a taxonomy of phonemes; at least one learning activity selected from: songs, chants, books, poems, puzzles, games, art activities, and printable activities; voiceover audio in said target language; and a software module for recording said learner's pronunciation and comparing it to one or more model pronunciations.

Also disclosed herein, in various embodiments, are computer-implemented language immersion teaching methods for learners aged about 3 to about 10 years comprising the step of providing executable instructions to a digital processing device comprising an operating system configured to perform executable instructions, to create a language immersion teaching environment, wherein said environment comprises: a plurality of learning activities associated with a target language, wherein at least one learning activity is based on a taxonomy of phonemes, wherein at least one learning activity is selected from: songs, chants, books, poems, puzzles, games, art activities, and printable activities; an instructional plan organizing said activities, wherein said organization creates a progression of educational objectives comprising teaching phoneme sounds, phonemes in the context of the beginning, middle, and end of words, word families, vocabulary in the context of environments or themes, sentence structures, and common conversational patterns; voiceover audio in said target language; and a software module for recording said learner's pronunciation and comparing it to one or more model pronunciations.

VARIOUS DEFINITIONS

The term "age," as used herein, refers to the length of time that a person has lived and also serves as an expression of a person's maturational progress in terms of emotional functioning, social functioning, psychological functioning, mental functioning, cognitive functioning, and motor skills.

The term "learners aged about 3 to about 10 years," as used herein, refers to a person who interacts with an educational system for the purpose of gaining knowledge, insight, or understanding of one or more target languages or by virtue of having been allowed, asked, or assigned to interact with an educational system, wherein the person is aged about 3, 4, 5, 6, 7, 8, 9, or 10 years or possesses emotional, social, psychological, mental, or cognitive functioning comparable to a person so aged.

The term "mentor," as used herein, refers to a person who has an interest in, or responsibility for, facilitating or furthering the educational development of a learner and includes, by way of non-limiting examples, a parent, step-parent, adoptive parent, foster parent, grandparent, guardian, relative, friend, guide, tutor, instructor, teacher, or professor, of a learner.

As used herein, "target language" means a native, first, second, additional, or foreign language that a learner desires to learn or has been allowed, asked, or assigned to learn for any reason.

As used herein, "immersion" is a method of teaching a target language in which the target language is optionally used for instruction, correction, encouragement, and/or navigation as well as for the content of subject material. Immersion uses the target language as a teaching tool, optionally and variably surrounding or "immersing" learners in the target language.

As used herein, "taxonomy" means a particular classification or organization of a plurality of elements. Taxonomies may arrange elements into groups and may arrange elements or groups in a hierarchical structure (e.g., groups and subgroups). Taxonomies may be comprehensive, classifying all elements within the subject matter, or may be partial, only classifying a portion of the elements within the subject matter.

As used herein, "phoneme" means any of the abstract units of a language that correspond to a set of similar speech sounds which are perceived to be a single distinctive sound in the language.

The term "instructional designer," as used herein, refers to any person who designs and/or evaluates learning activities, and grouped sequences of activities, that are elements of an educational system.

The term "instructional plan," as used herein, refers to a plan, conceived by an instructional designer or a mentor to a learner, designed to accomplish one or more specific educational objectives through the mutual reinforcement of individual learning activities.

The term "standalone application," as used herein, refers to a program that is run as an independent computer process, not an add-on to an existing process. Standalone applications are often compiled and executable.

Language Immersion Teaching Environment

The systems, products, programs, and methods for language immersion teaching disclosed herein include a language immersion teaching environment. In some embodiments, a language immersion teaching environment includes a graphic user interface (GUI) that represents a metaphor suitable for language learning. In a particular embodiment, the metaphor is a classroom (see e.g., FIG. 1). In some embodiments, the environment further includes a plurality of learning activities associated with a target language. The learning activities are appropriate for language learners aged about 3 to about 10 years and at least one activity is a song, chant, book, poem, puzzle, game, art activity, or printable activity. In further embodiments, the content of one or more learning activities is based on a taxonomy of phonemes in the target language. In some embodiments, the learning activities include voiceover audio in the target language. In some embodiments, the learning activities further include a software module for providing voiceover audio. In some embodiments, the learning activities further include a software module for recording a learner's pronunciation of phonemes, words, sentences, and conversations in the target language and comparing them to one or more model pronunciations. Referring to FIG. 1, in a particular embodiment, the GUI of the language immersion teaching environment provides access to a plurality of learning activities appropriate for language learners aged about 3 to about 10 years that include voiceover audio in the target language.

In a particular embodiment, the taxonomy of phonemes is designed to help learners access, navigate, and remember the phonemes of a target language. In a further embodiment, the learning activities are selected to engage language learners aged about 3 to about 10 years and at least one of the activities is based on the taxonomy of phonemes. In a further embodiment, the voiceover audio is designed to model the sounds of phonemes, words, sentences, and conversations in the target language and the software module for recording a learner's pronunciations comparing them to model pronunciations is designed to provide the learner with opportunities for practice and evaluation.

In some embodiments, the language immersion teaching environments are intranet-based. In some embodiments, the language immersion teaching environments are Internet-based. In further embodiments, the environments are World Wide Web-based. In still further embodiments, the environments are cloud computing-based. In other embodiments, the environments are based on data storage devices including, by way of non-limiting examples, CD-ROMs, DVDs, flash memory devices, magnetic disk drives, and optical disk drives.

Learning Activities

Figure 6:
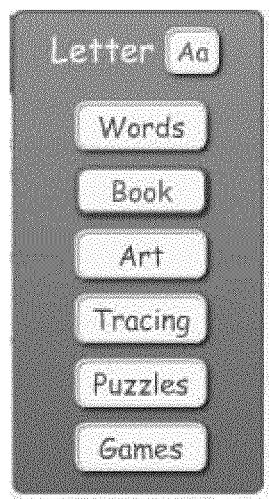
FIG. 6 shows a non-limiting example of a menu of learning activities associated with a target language; in this case, learning activities based on a taxonomy of phonemes and including books, art activities, puzzles, and games.
Figure 7:
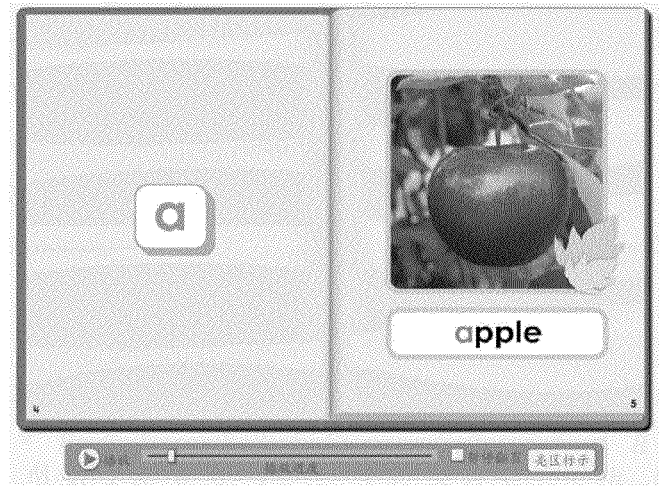
FIG. 7 shows a non-limiting example of a learning activity based on a taxonomy of phonemes; in this case, a book designed to accomplish an educational objective related to teaching the sound of a phoneme in the context of the beginning of a word.

The systems, products, programs, and methods described herein include a plurality of learning activities. In some embodiments, the learning activities are appropriate for learners aged about 3 to about 10 years and include, by way of non-limiting examples, songs, chants, books, poems, puzzles, games, art activities, and printable activities. FIG. 6 illustrates a non-limiting example of a menu providing access to appropriate learning activities. FIG. 7 shows a non-limiting example of a book activity based on a taxonomy of phonemes that is depicted demonstrating the English phoneme /a/ by presenting a letter representing the phoneme, an image representing associated with the phoneme, the phoneme in the context of the word "apple," and a voiced model pronunciation of the phoneme and the word.

In some embodiments, the plurality of activities is organized according to an instructional plan designed to accomplish one or more educational objectives in a target language through the mutual reinforcement of individual activities. In further embodiments, an instructional plan interconnects two or more activities associated with a subject in such a way that understanding is built progressively with one or more activities adding to the educational messages of one or more previous activities. In some embodiments, an instructional designer constructs an instructional plan. In other embodiments, a mentor to a learner constructs an instructional plan. In other embodiments, a software module constructs an instructional plan according to the requirements of one or more published educational standards.

In some embodiments, the content of the learning activities is based on a taxonomy of phonemes in a target language. In some embodiments, the instructional plan is based on a taxonomy of phonemes in a target language. In further embodiments, the instructional plan comprises a progression of educational objectives including teaching phoneme sounds, phoneme sounds in the context of the beginning, middle, and end of words, word families, vocabulary in the context of environments or themes, sentence structures, and common conversational patterns. In some embodiments, the plurality of activities includes activities designed to accomplish one or more educational objectives related to teaching sounds of phonemes and teaching phonemes in the context of the beginning, middle, and end of words. In some embodiments, the plurality of activities includes activities designed to accomplish one or more educational objectives related to teaching one or more word families. In some embodiments, the plurality of activities includes activities designed to accomplish one or more educational objectives related to teaching vocabulary in the context of a particular environment or theme. In some embodiments, the plurality of activities includes activities designed to accomplish one or more educational objectives related to teaching sentence structures and common conversational patterns.

Figure 2:
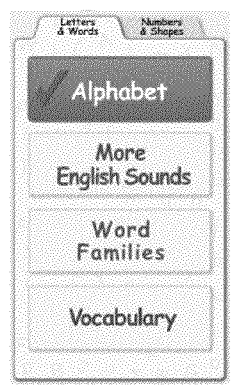
FIG. 2 shows a non-limiting example of a progression of educational objectives; in this case, a progression comprising teaching phoneme sounds, phoneme sounds in the context of the beginning, middle, and end of words, word families, and vocabulary in the context of environments or themes.
Figure 5:
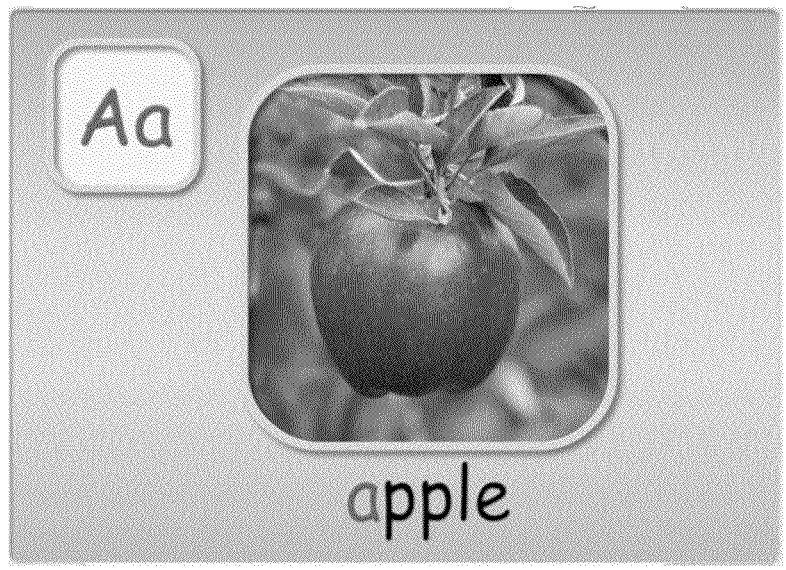
FIG. 5 shows a non-limiting example of a learning activity based on a taxonomy of phonemes; in this case, a learning activity designed to accomplish an educational objective related to teaching the sound of a phoneme in the context of the beginning of a word.
Figure 8:
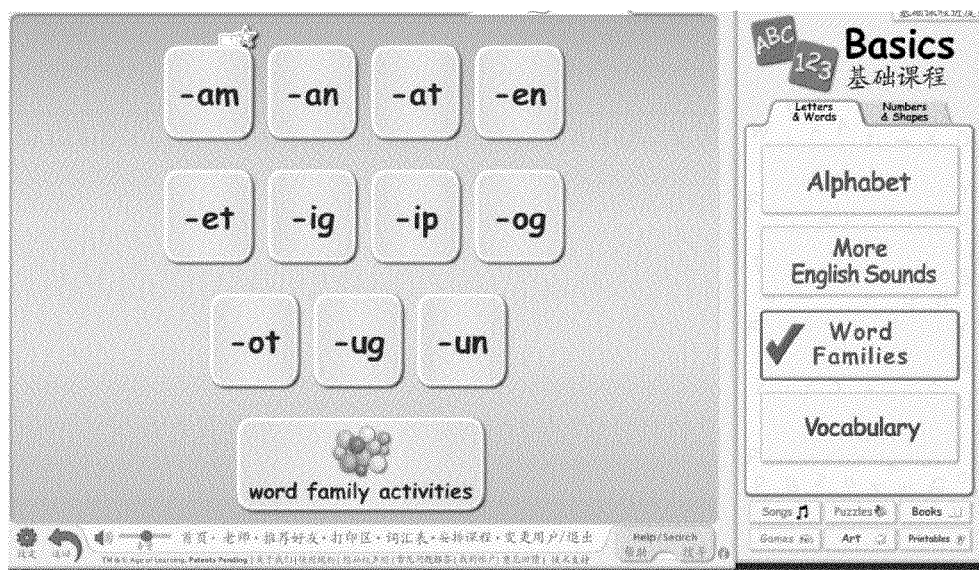
FIG. 8 shows a non-limiting example of a menu of learning activities associated with a target language; in this case, learning activities based on a taxonomy of phonemes and designed to accomplish educational objectives related to teaching word families in the English language.
Figure 9:
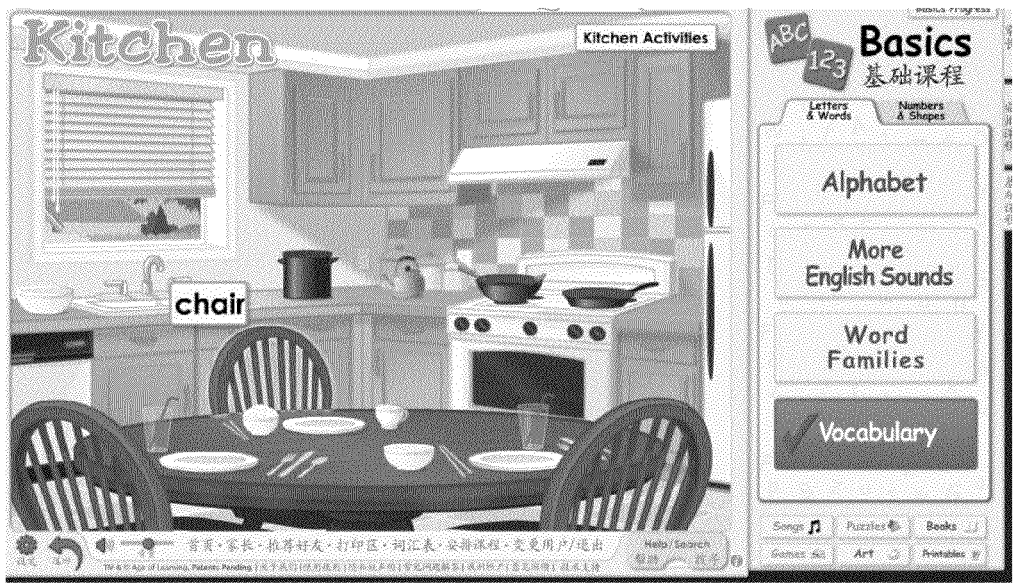
FIG. 9 shows a non-limiting example of a learning activity; in this case, a learning activity designed to accomplish an educational objective related to teaching vocabulary in the context of a kitchen environment.
Figure 10:
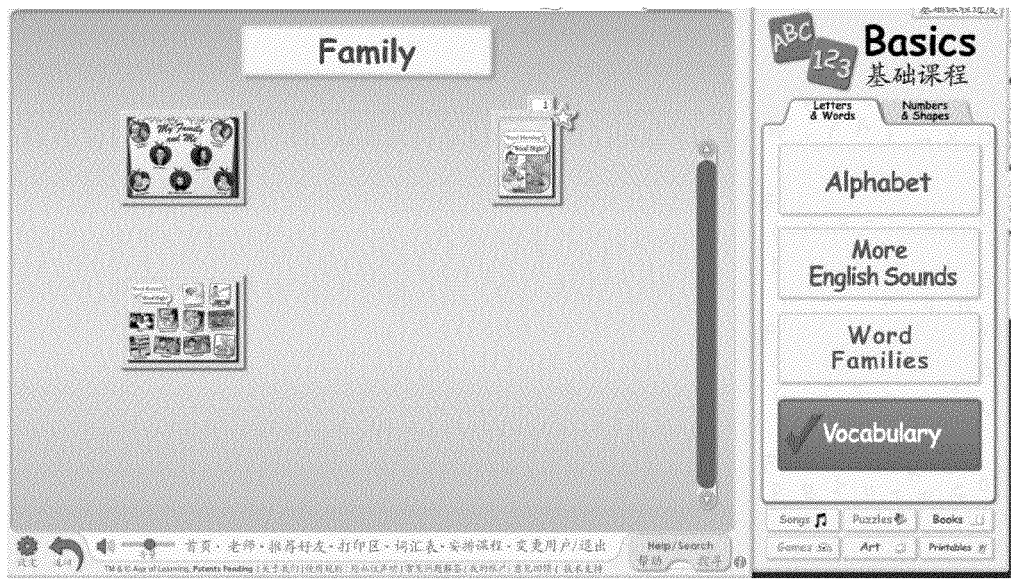
FIG. 10 shows a non-limiting example of a menu of learning activities; in this case, learning activities designed to accomplish an educational objective related to teaching vocabulary in the context of a family theme.

FIG. 2 illustrates an example of a menu providing access to learning activities organized according to an instructional plan that creates a progression of educational objectives including, teaching phoneme sounds, phoneme sounds in the context of the beginning, middle, and end of words, word families, and vocabulary in the context of environments or themes. FIGS. 5, 8, 9, and 10 present non-limiting examples of learning activities or menus providing access to activities that teach toward objectives in such a progression. FIG. 5 shows a particular non-limiting example of a learning activity based on a taxonomy of phonemes and designed to demonstrate the English phoneme /a/ by presenting a letter representing the phoneme, an image associated with the phoneme, the phoneme in the context of the beginning of the word "apple," and a voiced model pronunciation of the phoneme and the word. FIG. 8 shows a particular non-limiting example of a menu providing access to learning activities based on a taxonomy of phonemes and designed to accomplish educational objectives related to teaching word families in the English language. FIG. 9 shows a particular non-limiting example of a learning activity designed to accomplish an educational objective related to teaching vocabulary in the context of a kitchen environment. FIG. 10 shows a particular non-limiting example of a menu of learning activities designed to accomplish an educational objective related to teaching vocabulary in the context of a family theme.

In various embodiments, an instructional plan addresses, by way of non-limiting examples, a lesson, a learning unit, and a level of study. In some embodiments, an instructional plan addresses a lesson, which is one or more learning activities that teach toward a specific educational objective or a specific element of a published educational standard. In some embodiments, an instructional plan addresses a learning unit, which is one or more lessons that teach toward a general educational objective or a general element of a published educational standard. In some embodiments, an instructional plan addresses a level of study, which is one or more learning units that teach toward a plurality of general educational objectives or an overarching element of a published educational standard.

In some embodiments, learning activities include visual and audio content, for example, text, images, video, audio, motion, interactivity, and animation. In further embodiments, interactive content allows a learner to interact with the learning activity through text, hyperlinks, graphical icons and other visual elements, manipulation of graphical elements, auditory elements, and motion elements. In view of the disclosure provided herein, learning activities are created by techniques known to those of skill in the art using machines, software, and languages known to the art. Those of skill in the art will recognize that several digital multimedia formats are suitable including, by way of non-limiting examples, Flash®, QuickTime®, Real Media®, Windows Media®, Silverlight®, Java™, HTML 5, XHTML 5, Unity®, Audio Video Interleave (AVI), and Moving Pictures Expert Group (MPEG).

Target Language

The systems, products, programs, and methods described herein include a plurality of learning activities associated with a target language. In some embodiments, a target language is a language that a learner desires to learn or has been allowed, asked, or assigned to learn. In further embodiments, a target language is the native or first language of a learner. In other embodiments, a target language is a second, additional, or foreign language. In various embodiments, the target language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. Suitable target languages include those that are new to a learner, those with which the learner has some familiarity, those with which a learner has proficiency, and those in which a learner is fluent, but is motivated to refine their language skills.

In some embodiments, the learning activities described herein include, by way of non-limiting examples, text, images, video, audio, motion, interactivity, and animation in the target language. In further embodiments, audio includes voiceover audio in the target language. In some embodiments, text, images, video, audio, motion, interactivity, and animation in the target language are used for content of the subject material. In some embodiments, text, images, video, audio, motion, interactivity, and animation in the target language are used for, by way of non-limiting examples, instruction, correction, encouragement, and navigation.

Taxonomy of Phonemes

The systems, products, programs, and methods described herein include a plurality of learning activities associated with a target language including at least one learning activity based on a taxonomy of phonemes. In light of the disclosure provided herein, those of skill in the art will recognize that a phoneme is any of the abstract units of a language that correspond to a set of similar speech sounds which are perceived to be a single distinctive sound in the language. Those of skill in the art will further recognize that in transcription, phonemes are often written between slashes. Thus, a phoneme is a sound or a group of slightly different sounds which are perceived to have the same function by speakers of a language. Changing a phoneme within a word often changes the meaning of the word to speakers of a language. In some languages, there is a strong match between individual letters and phonemes. In other languages, there is a weaker match between individual letters and phonemes. For example, in English the letters "c" and "k" can represent the same phoneme as in /c/ar/ and /k/ar/t/. Moreover, changing this phoneme to a different phoneme, in many cases, changes the meaning of the word, for example, /p/ar/ or /p/ar/t/. Words of a language are constructed of phonemes and those proficient with a language recognize phonemes at the beginning, middle, and end of words. For example, in English, the phoneme /m/, represented by the letter "m," is recognized by English speakers at the beginning of /m/a/p/, in the middle of /k/a/m/er/u/, and the end of /h/a/m/. Word families are formed by words that share one, two, or several common phonemes or by words that differ by one, two, or a limited number of phonemes.

Figure 3:
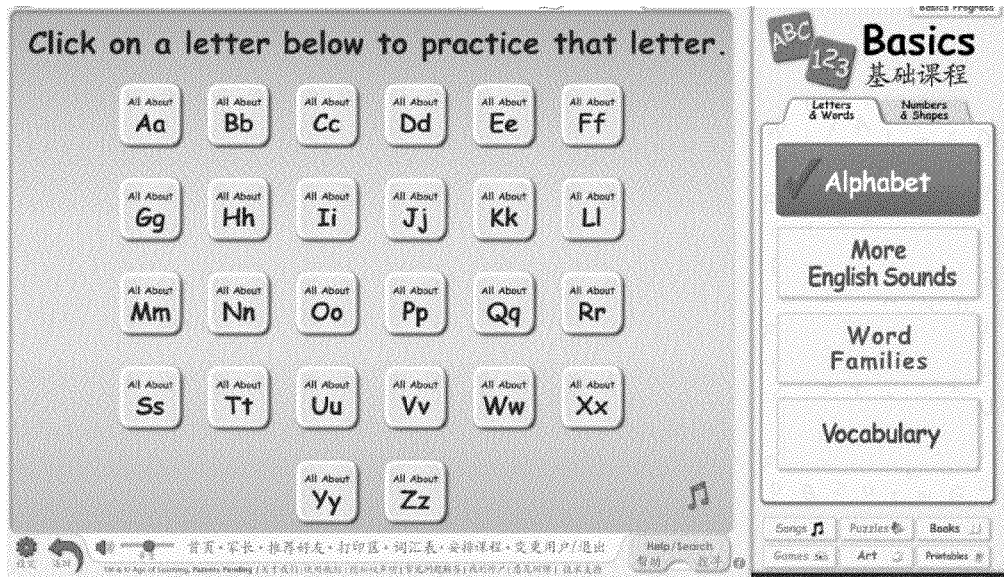
FIG. 3 shows a non-limiting example of a taxonomy of phonemes; in this case, a taxonomy of phonemes in the English language including phonemes represented by a letter.
Figure 4:
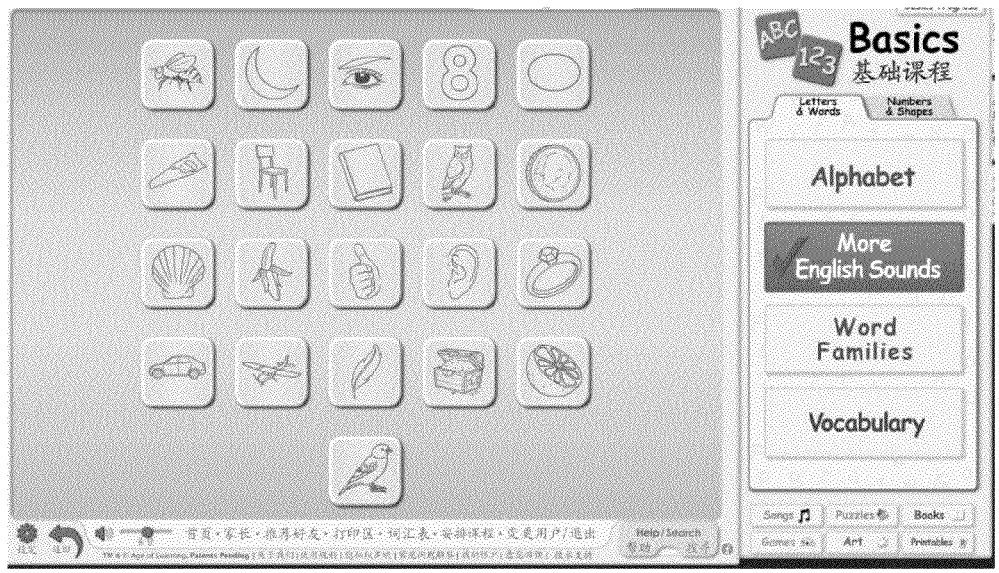
FIG. 4 shows a non-limiting example of a taxonomy of phonemes; in this case, a taxonomy of phonemes in the English language including phonemes represented by an image.

The taxonomy of phonemes of the present invention is a particular classification or organization of phonemes of a target language. In some embodiments, the taxonomy organizes phonemes into groups. In further embodiments, groups of phonemes are hierarchical, for example, a taxonomy that organizes phonemes into one or more subgroups within one or more groups. In other embodiments, groups of phonemes are non-hierarchical. In some embodiments, a taxonomy of phonemes includes phonemes represented by a single letter and/or phonemes represented by one or more combinations of letters. In a particular embodiment, in English, phonemes represented by a single letter include /m/, /k/, /a/, /t/, /u/, /i/, /p/, /d/, /s/, /o/, /e/, /g/, /f/, /n/, /b/, /w/, /r/, /y/, /v/, /h/, /j/, /l/, and /z/. In a further particular embodiment, in English, phonemes represented by a combination of letters include /ar/, /ay/, /ie/, /or/, /th/, /air/, /oh/, /ee/, /oo/, /oi/, /ng/, /ear/, /ow/, /sh/, /ue/, /ch/, /er/, /aw/, and /zh/. In some embodiments, a taxonomy of phonemes includes phonemes represented by a symbol. In a particular embodiment, phonemes represented by a symbol include /ə/ (also referred to as schwa). For example, FIG. 3 shows a particular non-limiting taxonomy of phonemes in the English language including phonemes represented by a letter. In some embodiments, a taxonomy of phonemes includes phonemes represented by an image. In further embodiments, the image is a photograph, illustration, video, or animation of, by way of non-limiting examples, an object, event, or situation, which is associated with the sound of the phoneme. For example, FIG. 4 shows a particular non-limiting taxonomy of phonemes in the English language including phonemes represented by an image.

In some embodiments, a taxonomy of phonemes organizes phonemes into groups for consonant phonemes and vowel phonemes. In a particular embodiment, in Spanish, consonant phonemes letter include /b/, /ch/, /d/, /f/, /g/, /h/, /k/, /l/, /m/, /n/, /ny/, /p/, /r/, /rr/ (e.g., rolling "r"), /s/, /t/, /w/, and /y/. In a further particular embodiment, in Spanish, vowel phonemes include /a/, /e/, /i/, /o/, /u/, /ai/, /au/, /ei/, /eu/, /ia/, /ie/, /io/, /iu/, /sh/, /oi/, /ou/, /ua/, /ue/, /ui/ and /uo/.

In some embodiments, the taxonomy of phonemes is comprehensive, classifying all of the phonemes known to a target language. In other embodiments, the taxonomy of phonemes is partial, classifying a portion of the phonemes known to a target language. In various embodiments, the taxonomy of phonemes classifies about 10%, 20%, 30%, 40%, 50%, 60%, 70%, 80%, 90%, 95%, or 98% of the phonemes known to a target language.

In some embodiments, learning activities are organized according to an instructional plan based on a taxonomy of phonemes of a target language. In further embodiments, the plurality of activities includes one or more activities designed to accomplish one or more educational objectives related to, by way of non-limiting examples, teaching sounds of phonemes, teaching phonemes in the context of the beginning, middle, and end of words, teaching word families, teaching vocabulary in the context of a particular environment, teaching vocabulary in the context of a particular theme, teaching sentence structures, and teaching common conversational patterns.

Voiceover Audio

The systems, products, programs, and methods described herein provide a language immersion teaching environment. Immersion is a method of teaching a target language in which the target language is optionally used for instruction, correction, encouragement, and/or navigation in addition to the content of subject material. Accordingly, the systems, products, programs, and methods described herein include spoken word or voiceover audio in a target language. In some embodiments, the systems, products, programs, and methods described herein include a software module for providing voiceover audio. In some embodiments, spoken word or voiceover audio includes, by way of non-limiting examples, a single recorded voice, recorded conversations between two people, recorded conversations between more than two people, animal sounds, nature sounds, singing, chanting, music, and sound effects. In some embodiments, voiceover audio is associated with other media including, by way of non-limiting examples, text, images, video, motion, interactivity, animation, or combinations thereof. In further embodiments, the voiceover audio is synchronized with video, motion, interactivity, animation, or combinations thereof.

In some embodiments, spoken word or voiceover audio is used to instruct a learner or a mentor to a learner. In further embodiments, spoken word or voiceover audio is used to explain how to use software modules, content features, and learning activities. In some embodiments, spoken word or voiceover audio is used to correct a learner when they submit an incorrect response to a learning activity. In further embodiments, spoken word or voiceover audio is used to alert the learner of an incorrect response and provide an example of a more correct response. In some embodiments, spoken word or voiceover audio is used to encourage a learner. In further embodiments, spoken word or voiceover audio is used to congratulate and praise. In some embodiments, spoken word or voiceover audio is used to help a learner or a mentor navigate a computer-based environment. In further embodiments, spoken word or voiceover audio is used to indicate the function of links, buttons, and other navigational elements.

In some embodiments, spoken word or voiceover audio comprises the subject matter of one or more learning activities. In further embodiments, spoken word or voiceover audio is used to model or demonstrate the sounds of phonemes in a target language and their proper pronunciation. In still further embodiments, spoken word or voiceover audio is used to provide practice recognizing phonemes and their sounds within the beginning, middle, and end of words, and joining the sounds to form words as well as breaking words down into phonemes. In some embodiments, spoken word or voiceover audio is used to model or demonstrate, by way of non-limiting examples, vocabulary, sentence structures, and common conversational patterns in a target language.

In light of the disclosure provided herein, those of skill in the art will recognize that several digital audio formats are available for computer-based delivery of spoken word or voiceover audio. These include, by way of non-limiting examples, uncompressed audio formats, such as WAV, AIFF, AU, and PCM; formats with lossless compression, such as FLAC, Monkey's Audio, WavPack, Shorten, TTA, ATRAC Advanced Lossless, Apple® Lossless, MPEG-4, and Windows Media® Audio Lossless; and formats with lossy compression, such as MP3, Vorbis, Musepack, AAC, Real Audio, ATRAC, and Windows Media® Audio Lossy. Audio compression is a form of data compression designed to reduce the transmission bandwidth requirement of digital audio and the storage size of audio files. Audio compression algorithms are implemented in computer software as audio codecs (a truncation of compressor-decompressor or coder-decoder). In some embodiments, spoken word audio is compressed. In further embodiments, audio data is compressed with a lossless codec. In still further embodiments, audio data is compressed with a lossless codec to varying degrees familiar to those of skill in the art. In further embodiments, audio data is compressed with a lossy codec. In still further embodiments, audio data is compressed with a lossy codec to varying degrees familiar to those of skill in the art. In other embodiments, spoken word audio is uncompressed. In some embodiments, spoken word or voiceover audio is included in video or multimedia content. In further embodiments, audio is included in media formats including, by way of non-limiting examples, Windows Media Video (WMV), Motion Picture Experts Group (MPEG), Audio Video Interleave (AVI), QuickTime®, Real Media®, Windows Media®, Flash®, Silverlight®, Java™, HTML 5, XHTML 5, and Unity®.

Recording and Comparing Pronunciation

The systems, products, programs, and methods described herein, in some embodiments, further comprise a software module for recording a language learner's pronunciation of phonemes and words of a target language and comparing them to one or more model pronunciations. In some embodiments, the software module for recording a language learner's pronunciation accesses a microphone associated with the digital processing device. In further embodiments, the microphone is integrated with the processing device. In other embodiments, the microphone is reversibly, but operably connected to the processing device. In still further embodiments, the software module uses APIs of the operating system, a web browser, or another software application to communicate with a microphone associated with the processing device. In some embodiments, the software module is configured to allow a learner to upload a previously recorded pronunciation audio or video file. In some embodiments, the software module for recording a language learner's pronunciation accesses a sound output device or speaker associated with the digital processing device. In further embodiments, the sound output device is integrated with the processing device. In other embodiments, the sound output device is reversibly, but operably connected to the processing device.

Figure 11:
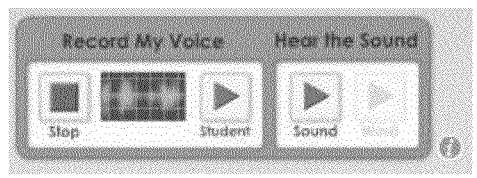
FIG. 11 shows a non-limiting example of a software module for recording and comparing pronunciations to model pronunciations; in this case, a software module including a visual voice or audio indicator and play buttons for recorded audio as well as model phoneme pronunciations and model word pronunciations.

Referring to FIG. 11, in some embodiments, the software module includes features, including GUI elements, associated with recording the voice of a language learner. In further embodiments, the recording GUI elements include, by way of non-limiting examples, a combined (e.g., modal) start/stop button that activates/deactivates voice recording features, separate start and stop buttons that activate and deactivate voice recording features, a play button that plays recorded audio, and a volume control. In still further embodiments, the recording GUI elements include a visual sound or voice indicator. In still further embodiments, the visual indicator is, by way of non-limiting examples, a waveform display, an audio levels display, a graphic equalizer display, or combinations thereof. In some embodiments, recording a pronunciation activates the visual sound or voice indicator and viewing the indicator reveals a visual signature of the pronunciation of a phoneme, word, sentence, or conversation.

Continuing to refer to FIG. 11, in some embodiments, the software module includes features, including GUI elements, associated with comparing the voice of a language learner to a model pronunciation. In further embodiments, the comparing GUI elements include, by way of non-limiting examples, combined or separate start/stop buttons for playing a model phoneme pronunciation, a model word pronunciation, a model sentence, or a model conversation. In further embodiments, playing model pronunciation activates a visual sound or voice indicator and viewing the indicator reveals a visual signature of the pronunciation. In some embodiments, the features associated with recording a learner's voice are displayed closely in proximity to the features associated with comparing a recording to a model such that a learner easily plays recordings of their own voice quickly followed by model pronunciations to access the similarities and differences. In some embodiments, the GUI elements described herein are utilized by interactions including, for example, click with a pointing device such as a mouse, trackpad, or trackball, tap or other gesture with a touchscreen or multi-touch screen, keystroke, or voice command.

In some embodiments, the software module for recording a learner's pronunciation and comparing it to one or more model pronunciations is configured to provide feedback to a learner or a mentor to a learner regarding the comparison. In some embodiments, the feedback is adapted to illustrate the similarities and differences between a learner's pronunciation and a model pronunciation. In further embodiments, the feedback is a waveform analysis. In still further embodiments, data from the visual sound or voice indicator for a learner recording is compared to that for a model pronunciation. In further embodiments, the feedback is in the form of a pronunciation score. In still further embodiments, a pronunciation score is mathematically generated by the software module by comparing one or more digital characteristics of a learner recording with those of a model pronunciation.

In light of the disclosure provided herein, those of skill in the art will recognize that in various embodiments a software module for recording a language learner's pronunciation of phonemes and words of a target language and comparing them to one or more model pronunciations is implemented in a multitude of ways. In some embodiments, the software module for recording and comparing pronunciations is a feature integrated into the GUI of the language immersion teaching environment described herein. In further embodiments, the software module is accessible by interacting with a link or icon integrated into the GUI of the environment. In further embodiments, the software module is in a layer or level above the GUI of the environment. In some embodiments, the software module for recording and comparing pronunciations comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for recording and comparing pronunciations comprises a standalone application, which is a program that is run as an independent computer process, not an add-on to an existing process. In further embodiments, a standalone application providing recording and comparison is compiled and executable. In some embodiments, a standalone application is in communication with and adapted for use in conjunction with a language learning activity or a language immersion teaching environment, which is implemented separately. In some embodiments, the software module for recording and comparing pronunciations comprises a mobile application. In further embodiments, a mobile application is in communication with and adapted for use in conjunction with a language learning activity or a language immersion teaching environment, which is implemented separately.

Translation of Voiceover Audio or Text

Figure 14:
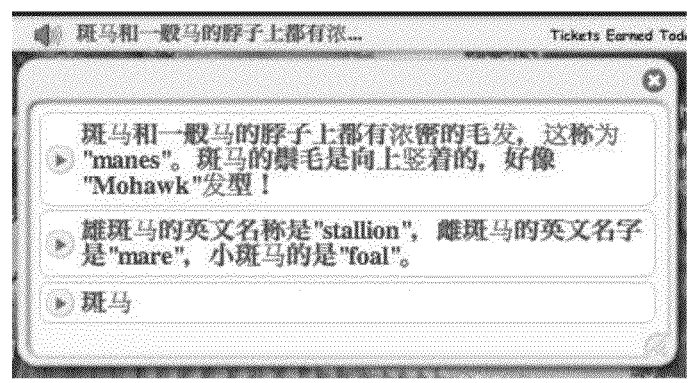
FIG. 14 shows a non-limiting example of a software module for translation of voiceover; in this case, a software module for written and voiced translation of voiceover, which maintains a running list of recent voiceovers.

The systems, products, programs, and methods described herein include a software module for providing translation of voiceover and/or text from a target language to a specified language. In some embodiments, the software module for providing translation of voiceover and/or text translates voiceover or text, or both voiceover and text associated with, by way of non-limiting examples, instruction, correction, encouragement, navigation, or language learning content. In further embodiments, voiceover and/or text is associated with a learning activity or with a language immersion teaching environment. In some embodiments, the translation is written. In some embodiments, the translation is voiced. In other embodiments, the translation is both written and voiced. In some embodiments, the software module provides access to written and voiced translation of the most recently played voiceover or the most recently displayed text. In other embodiments, the software module maintains a list of recently played voiceovers and recently displayed text and provides access to written and voiced translation of each (see e.g., FIG. 14). In further embodiments, the software module provides ready access to translation of the most recent voiceover or text and provides, through further interaction, access to translation of a list of additional recent voiceovers and/or text (see e.g., FIG. 14). In further embodiments, a list of translations of recent voiceovers, text, or both, includes translations of the most recent 2, 3, 4, 5, 6, 7, 8, 9, 10, 20, 30, 40, or 50 voiceovers and/or text. In still further embodiments, translations of voiceover and text are accessed by interaction with, for example, an image, icon, text, or link, or other GUI element. In still further embodiments, translations of voiceover and text are accessed by interactions including, for example, click with a pointing device such as a mouse, trackpad, or trackball, tap or other gesture with a touchscreen or multitouch screen, keystroke, or voice command.

In some embodiments, the software module for providing translation of voiceover and/or text produces a written translation by selecting appropriate text data from among a collection of stored data. In various embodiments, text data is stored in formats including, by way of non-limiting examples, Rich Text Format (RTF) and TXT. In further embodiments, text data is encoded according to Unicode or American Standard Code for Information Interchange (ASCII) standards. In some embodiments, the software module for providing translation of voiceover and/or text produces a voiced translation by selecting an appropriate audio data file from among a collection of stored data files. In various embodiments, audio data is stored in formats including, by way of non-limiting examples, MP3, WAV, AIFF, AU, Apple® Lossless, MPEG-4, Windows Media®, Vorbis, AAC, and Real Audio®. In further embodiments, text and audio data files are stored in an electronic repository such as one of the several databases known to the art.

Mentor involvement is often an important factor in the success of a language learning activity and often a factor in the overall success of a language immersion teaching environment. A mentor often provides encouragement and motivation in learning a language, even in cases where the mentor is not necessarily fluent or proficient in the target language. In some embodiments, the software module for providing translation of voiceover and/or text is adapted for use by a mentor. In further embodiments, the software module is adapted to facilitate a mentor's promotion of the educational development of a learner. In further embodiments, a mentor selects the specified language into which the software module translates voice and text content. In still further embodiments, a mentor selects a specified language, for example, by use of a pre-populated menu or by text entry, either within the module or in a separate settings or preferences area of a language immersion teaching environment. In various embodiments, the specified language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In some embodiments, a mentor regulates access to the software module. In further embodiments, a mentor turns the software module on or off. In further embodiments, a mentor configures in which areas, sections, views, screens, or pages of the environment the software module is available.

Some learners also benefit from the ability to customize their learning experience. In some embodiments, the software module for providing translation of voiceover and/or text is further adapted for use by a learner. In further embodiments, the software module is adapted to facilitate a learner's ability to customize the degree of immersion in the environment. In further embodiments, a learner selects the specified language into which the software module translates voice and text content. In still further embodiments, a learner selects a specified language, for example, by use of a pre-populated menu or by text entry, either within the module or in a separate settings or preferences area of a language immersion teaching environment. In some embodiments, a learner regulates their own access to the software module. In further embodiments, a learner turns the software module on or off. In further embodiments, a learner configures in which areas, sections, views, screens, or pages of the environment the software module is available.

In some embodiments, the software module for providing translation of voiceover and/or text is configurable to provide customization of learner immersion by optionally translating voiceover and/or text based on the type, content, or purpose of the voiceover and/or text. In further embodiments, the software module is configurable to translate all voiceover and/or text. In still further embodiments, the software module is optionally configurable to translate voiceover and/or text associated with content of learning activities. In still further embodiments, the software module is optionally configurable to translate voiceover and/or text associated with instructions for learning activities. In still further embodiments, the software module is optionally configurable to translate voiceover and/or text associated with navigation within the environment. In still further embodiments, the software module is optionally configurable to translate voiceover and/or text associated with correction and encouragement of a learner. In still further embodiments, the software module is optionally configurable to translate no voiceover and/or text. In some embodiments, the software module is configurable to translate any combination of the types of voiceover and/or text described herein. In further embodiments translation of voiceover content is configured separately from translation of text content. In further embodiments, a mentor to a language learner configures the types of content translated by the module. In other embodiments, a learner configures the types of content translated by the module.

In light of the disclosure provided herein, those of skill in the art will recognize that in various embodiments a software module for providing translation of voiceover and/or text is implemented in a multitude of ways. In some embodiments, the software module is accessible from every area, section, view, screen, or page of the language immersion teaching environment described herein. In other embodiments, the software module is accessible from select areas, sections, views, screens, or pages of the environment. In further embodiments, the software module is accessible from areas, sections, views, screens, or pages of the environment including voiceover or text pertaining to, by way of non-limiting examples, instruction, correction, encouragement, navigation, language learning content, or any combination thereof. In some embodiments, the software module for providing translation of voiceover and/or text is a feature integrated into the GUI of the language immersion teaching environment described herein. In further embodiments, the software module is accessible by interacting with a link or icon integrated into the GUI of the environment. In further embodiments, the software module is in a layer or level above the GUI of the environment.

Figure 12:
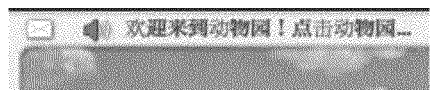
FIG. 12 shows a non-limiting example of a software module for translation of voiceover; in this case, a software module for written and voiced translation of English voiceover in a learning activity to Mandarin Chinese.
Figure 13:
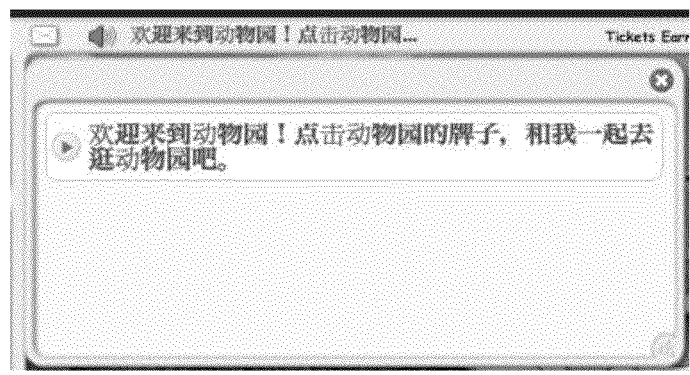
FIG. 13 shows a non-limiting example of a software module for translation of voiceover; in this case, a software module for written and voiced translation of voiceover, which includes full-length translations revealed by interacting with an icon or a truncated translation.

Referring to FIG. 1, in particular embodiments, a software module for providing translation is integrated into the language immersion teaching environment (see also isolated close-up example in FIG. 12). A written translation of the most recently played voiceover is displayed. In cases where the most recently played voiceover is lengthy, the written translation is potentially truncated. Further, a voiced translation of the most recently played voiceover is available by interacting with a speaker icon. Now referring to FIG. 13, in particular embodiments, full-length written and voiced translations of the most recently played voiceover are available by clicking on the text. Now referring to FIG. 14, in particular embodiments, the software module provides access to a list of written and voiced translations of the several most recently played voiceovers.

In some embodiments, the software module for providing translation of voiceover and/or text comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for providing translation of voiceover and/or text comprises a standalone application, which is a program that is run as an independent computer process, not an add-on to an existing process. In further embodiments, a standalone application providing translation is compiled and executable. In some embodiments, a standalone application is in communication with and adapted for use in conjunction with a language learning activity or a language immersion teaching environment, which is implemented separately. In some embodiments, the software module for providing translation of voiceover and/or text comprises a mobile application. In further embodiments, a mobile application is in communication with and adapted for use in conjunction with a language learning activity or a language immersion teaching environment, which is implemented separately.

Monitoring Learner Progress

The systems, products, programs, and methods described herein further comprise a software module for monitoring the progress of one or more language learners. In some embodiments, the software module for monitoring learner progress is adapted for use by a mentor to one or more language learners. In further embodiments, the software module is only accessible by a mentor. In various embodiments, the software module for monitoring learner progress allows a mentor to monitor the progress of, for example, a single learner, a group of learners, or a class of learners. In further embodiments, the progress of a group or class of learners is monitored in aggregate. In other embodiments, the progress of a group or class of learners is monitored at the level of individual learners. In some embodiments, the software module for monitoring learner progress is adapted for use by a language learner. In further embodiments, the software module is accessible by a mentor or a learner. In still further embodiments, the software module for monitoring learner progress allows a learner to monitor their own progress. In still further embodiments, the software module for monitoring learner progress allows a learner to compare their progress to the aggregate progress of a group or class of learners.

In some embodiments, the software module for monitoring language learner progress generates an on-screen progress report. In further embodiments, the software module generates a printable progress report. In some embodiments, the software module reports the names of each language learning activity assigned. In some embodiments, the software module reports the names of each language learning activity completed. In some embodiments, the software module for monitoring learner progress reports the number of learning activities completed. In further embodiments, the software module reports the percentage of activities completed within a specific group of activities. In still further embodiments, the software module reports the number of times each activity has been completed by a learner. In various embodiments, the software module reports, for example, the date of assignment for each learning activity, the date of completion for each learning activity, the difficulty of each learning activity, and the number of days past due for each learning activity. In some embodiments, the software module reports the educational objectives achieved. In further embodiments, the educational objectives achieved are reported in conjunction with the objectives of an instructional plan or the objectives in a published educational standard. In some embodiments, the software module reports learner progress within an overall instructional plan or published educational standard. In some embodiments, the software module for monitoring learner progress identifies learning activities assigned as independent work. In further embodiments, the software module allows monitoring of independent activities separately from other activities. In some embodiments the report is available in a language specified by a mentor to a language learner. In further embodiments, a mentor specifies a language for the report from among a list of available languages such as those described herein.

Figure 15:
FIG. 15 shows a non-limiting example of a navigational menu for accessing a software module for monitoring the progress of a learner; in this case, a menu for accessing reports on a learner's progress toward a plurality of categories of learning objectives.
Figure 16:
FIG. 16 shows a non-limiting example of a software module for monitoring the progress of a learner; in this case, a module reporting information about a learner's progress toward one category of learning objectives (e.g., the English alphabet). The software module displays a title and an icon for each learning activity associated with the category of learning objectives. The module also reports information regarding which activities have been completed by a learner (as indicated by a star) and how many times each has been completed (as indicated by a number).

Referring to FIG. 15, in particular embodiments, the software module for monitoring learner progress organizes information about learner progress based on a plurality of categories of educational objectives. Now referring to FIG. 16, in particular embodiments, the software module for monitoring learner progress reports information regarding each learning activity that teaches toward each category of educational objectives. In further embodiments, the software module reports whether each activity has been completed and how many times it has been completed.

In light of the disclosure provided herein, those of skill in the art will recognize that in various embodiments a software module for monitoring the progress of one or more language learners is implemented in a multitude of ways. In some embodiments, the software module for monitoring the progress of one or more learners is a feature integrated into the GUI of the language immersion teaching environment described herein. In some embodiments, the software module is accessible from every area, section, view, screen, or page of the language immersion teaching environment described herein. In other embodiments, the software module is accessible from select areas, sections, views, screens, or pages of the environment. In further embodiments, the software module is accessible by interacting with a link or icon integrated into the GUI of the environment. In further embodiments, the software module is in a layer or level above the GUI of the environment. In some embodiments, the software module for monitoring learner progress comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for monitoring learner progress comprises a standalone application, which is a program that is run as an independent computer process, not an add-on to an existing process. In further embodiments, a standalone application monitoring learner progress is compiled and executable. In some embodiments, a standalone application is in communication with and adapted for use in conjunction with a language learning activity or a language immersion teaching environment, which is implemented separately. In some embodiments, the software module for monitoring learner progress comprises a mobile application. In further embodiments, a mobile application is in communication with and adapted for use in conjunction with a language learning activity or a language immersion teaching environment, which is implemented separately.

Rewarding Learners

The systems, products, programs, and methods described herein further comprise a software module for rewarding a learner for completing an activity. In some embodiments, the software module creates a virtual economy. A virtual economy is a system designed to encourage productive activity by awarding units. Anything that is visible and countable can be used as a unit. In an effective virtual economy, individuals receive units immediately after completing learning activities and the units are collected and later exchanged for a meaningful object or privilege. In further embodiments of the systems, products, programs, and methods disclosed herein, the virtual economy comprises one or more units awarded for completing an activity and one or more stores for spending awarded units on virtual items used in the language immersion teaching environment.

In some embodiments, units awarded for completing an activity are represented as virtual objects including, by way of non-limiting examples, coins, currency, gold bars, diamonds, jewels, or treasure. In some embodiments, units awarded for completing an activity are represented as abstractions including, by way of non-limiting examples, points, stars, hearts, smiley faces, or lightning bolts. In some embodiments, units awarded for completing an activity are represented as measures of qualities or attributes including, by way of non-limiting examples, strength, power, or life. In additional embodiments, the number of units awarded for completing an activity varies based on circumstances including, by way of non-limiting examples, performance in the activity, time spent on the activity, difficulty of the activity, or the number of times the learner has completed the activity. In one embodiment, the software module for rewarding a learner awards double units for completing an activity a fifth or subsequent time.

In some embodiments, the units are represented as virtual tickets. In some of these embodiments, the number of tickets awarded for completing an activity varies by the level of effort or time that the activity requires. In further embodiments, the virtual tickets are represented as dispensed from a virtual machine. In still further embodiments, the virtual ticket machine displays the number of tickets awarded for the last completed activity as well as the total number of tickets collected.

In some embodiments, the software module for rewarding a learner for completing an activity further includes a system for exchanging tickets. In some embodiments, tickets are exchanged to unlock or gain access to new learning activities. In some embodiments, tickets are exchanged for non-virtual merchandise. In some of these embodiments, the non-virtual merchandise includes, by way of non-limiting examples, clothing, posters, music, videos, desktop images, and ringtones. In other embodiments, tickets are exchanged for virtual items used in the language immersion teaching environment.

In some embodiments, tickets are exchanged for virtual items used in the language immersion teaching environment in one or more interactive virtual stores. In some embodiments, access to one or more stores is provided via a virtual shopping center that lists open stores, displays the number of tickets the learner earned that day, and the total number of tickets the learner has collected. In further embodiments, the virtual items used in the language immersion teaching environment include, by way of non-limiting examples, items to customize an avatar, virtual pets, and emoticons, which are icons representing emotion, usually used to express mood. In additional embodiments, the virtual items used in the language immersion teaching environment include skins for the GUI of the environment and themes for the GUI of the environment.

Digital Processing Device

The systems, products, programs, and methods described herein include a digital processing device. The digital processing device includes one or more hardware central processing units (CPU) that carry out the device's functions. The digital processing device further comprises an operating system configured to perform executable instructions. In some embodiments, the digital processing device further comprises a memory device, a display, an input device, and optionally a sound output device. In some embodiments, the digital processing device is connected to the Internet such that it accesses the World Wide Web. In other embodiments, the digital processing device is connected to an intranet. In other embodiments, the digital processing device is connected to a data storage device. In some embodiments, the digital processing device is a non-portable device, such as a server or a desktop computer. In other embodiments the digital processing device is a portable device, such as a laptop or tablet computer. In other embodiments the digital processing device is a mobile device, such as a smartphone or digital music player.

The digital processing device includes an operating system configured to perform executable instructions. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

In some embodiments, the digital processing device includes a visual display. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is a plasma display. In other embodiments, the display is a video projector. In still further embodiments, the display is a combination of devices such as those disclosed herein.

In some embodiments, the digital processing device includes an input device. In some embodiments, the input device is a keyboard or keypad. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the digital processing device optionally includes a sound output device. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

In accordance with the description provided herein, suitable digital processing devices include, by way of non-limiting examples, server computers, desktop computers, laptop computers, notebook computers, tablet computers, netbook computers, smartbook computers, subnotebook computers, ultra-mobile PCs, handheld computers, personal digital assistants, Internet appliances, smartphones, music players, and portable video game systems. Those of skill in the art will recognize that many mobile smartphones are suitable for use in the system described herein. Suitable tablet computers include those with booklet, slate, and convertible configurations, known to those of skill in the art. Suitable portable video game systems include, by way of non-limiting examples, Nintendo DS™ and Sony® PSP™

Computer Network

The systems, products, programs, and methods disclosed herein include a digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the computer program and/or mobile application is provided to the digital processing device via the Web. In still further embodiments, the Internet provides access to the World Wide Web and the computer program and/or mobile application is provided to the digital processing device via cloud computing. In other embodiments, the computer network comprises data storage devices including, by way of non-limiting examples, CD-ROMs, DVDs, flash memory devices, solid state memory, magnetic disk drives, magnetic tape drives, optical disk drives, cloud computing systems and services, and the like. In further embodiments, the computer program and/or mobile application is provided to the digital processing device via a data storage device.

Computer Readable Medium

In some embodiments, the systems, products, programs, and methods disclosed herein include one or more computer readable media encoded with a program including instructions executable by the operating system of an optionally networked digital processing device. In further embodiments, a computer readable medium is a tangible component of a digital processing device. In still further embodiments, a computer readable medium is optionally removable from a digital processing device. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like.

Computer Program

The systems, products, programs, and methods disclosed herein include at least one computer program. The computer program includes a sequence of instructions, executable in the digital processing device's CPU, written to perform a specified task. Those of skill in the art will recognize that the computer program may be written in various versions of various languages. In some embodiments, the computer program comprises one sequence of instructions. In some embodiments, the computer program comprises a plurality of sequences of instructions. In some embodiments, the computer program is delivered from one location. In other embodiments, the computer program is delivered from a plurality of locations. In some embodiments, the computer program is delivered from a cloud computing service. In various embodiments, the computer program comprises, in part or in whole, one or more web applications, one or more mobile applications, one or more standalone applications, one or more web browser plug-ins, extensions, add-ins, or add-ons, or combinations thereof.

Web Application

In some embodiments, the computer program includes a web application written in one or more markup languages, style languages, client-side scripting languages, server-side coding languages, or combinations thereof. In some embodiments, the computer program is written to some extent in a markup language such as Hypertext Markup Language (HTML), Extensible Hypertext Markup Language (XHTML), or eXtensible Markup Language (XML). In some embodiments, the computer program is written to some extent in a style language such as Cascading Style Sheets (CSS). In some embodiments, the computer program is written to some extent in a client-side scripting language such as Asynchronous Javascript and XML (AJAX), Actionscript, Javascript, or Silverlight®. In some embodiments, the computer program is written to some extent in a server-side coding language such as Active Server Pages (ASP), ColdFusion®, Perl, Java™, Hypertext Preprocessor (PHP), Python™, and Ruby. In some embodiments, the computer program utilizes a web framework such as Ruby on Rails (RoR) or .NET. In some embodiments, the computer program is written to some extent in a query language such as Structured Query Language (SQL). In some embodiments, the computer program utilizes a database system such as Microsoft® SQL Server, mySQL™, and Oracle®.

In some embodiments, the language immersion teaching environment is implemented as a web application. In further embodiments, the learning activities associated with a target language are implemented as part of a web application. In further embodiments, the software module for providing voiceover audio is part of a web application. In further embodiments, the software module for recording a learner's pronunciation and comparing it to one or more model pronunciations is part of a web application.

Mobile Application

In some embodiments, the computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, the mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Those of skill in the art will also recognize that mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone® and iPad® (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the language immersion teaching environment is implemented as a mobile application. In further embodiments, the learning activities associated with a target language are implemented as one or more mobile applications. In some embodiments, the software module for providing voiceover audio is implemented as a mobile application. In some embodiments, the software module for recording a learner's pronunciation and comparing it to one or more model pronunciations is implemented as a mobile application.

Standalone Application

In some embodiments, the computer program includes a standalone application, which is a program that is run as an independent computer process, not an add-on to an existing process, e.g. not a plug-in. Those of skill in the art will recognize that standalone applications are often compiled. A compiler is a computer program(s) that transforms source code written in a programming language into binary object code such assembly language or machine code. Suitable compiled programming languages include, by way of non-limiting examples, C, C++, Objective-C, COBOL, Delphi, Eiffel, Java™, Lisp, Visual Basic, and VB .NET, or combinations thereof. Compilation is often performed, at least in part, to create an executable program. In some embodiments, the computer program includes one or more executable complied applications.

In some embodiments, the language immersion teaching environment is implemented as a standalone application. In further embodiments, the learning activities associated with a target language are implemented as one or more standalone applications. In some embodiments, the software module for providing voiceover audio is implemented as a standalone application. In some embodiments, the software module for recording a learner's pronunciation and comparing it to one or more model pronunciations is implemented as a standalone application.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS®Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the software module for providing voiceover audio is implemented as a web browser extension, plug-in, add-in, or add-on. In some embodiments, the software module for recording a learner's pronunciation and comparing it to one or more model pronunciations is implemented as a web browser extension, plug-in, add-in, or add-on.

Software Modules

The systems, products, programs, and methods disclosed herein include, in various embodiments, software, server, and database modules. In view of the disclosure provided herein, the software modules are created by techniques known to those of skill in the art using machines, software, and languages known to the art. In some embodiments, the software modules are in one computer program or application. In other embodiments, the software modules are in more than one computer program or application. In some embodiments, the software modules are hosted on one machine. In other embodiments, the software modules are hosted on more than one machine. In some embodiments, the software modules are hosted on one or more machines in one location. In other embodiments, the software modules are hosted on one or more machines in more than one location.

EXAMPLES

The following illustrative examples are representative of embodiments of the systems, products, programs, and methods described herein and are not meant to be limiting in any way.

Example 1

The parents of a 5-year-old boy in Taiwan would like him to learn to speak, read, and write English. The boy and his parents are fluent in several dialects of Chinese, but are not proficient in English. The boy's parents provide him access to a web application that offers over one hundred interactive learning activities. The boy accesses the web application on his laptop computer that is connected to the World Wide Web. The learning activities are designed to engage young learners and include interactive formats such as chants, songs, and books for teaching English. The web application is an immersion teaching environment; therefore, the language learning activities include text, images, animation, video, and audio content in English and also use English to deliver instructions, navigational cues, praise, and correction. The young English learner is asked to spend twenty minutes a day, after his regular school homework is complete, playing and experimenting in this immersive English environment.

A majority of the learning activities in the immersion teaching environment are based on a taxonomy of phonemes identifying and classifying sounds of the English language. Each learning activity is designed to teach one or more phonemes. The learning activities are also organized according to an instructional plan designed by a team of professional instructional designers. The learning activities, organized according to the plan, teach a specific progression of educational objectives. Young learners participating in activities are first exposed to the phonemes and their sounds. Second they learn phonemes in the context of the beginning, middle, and end of words. Third, the learning activities focus on teaching word families followed by teaching vocabulary in the context of a particular environments and particular theme. Fourth, the learning activities focus on teaching sentence structures, and finally, on teaching common conversational patterns.

As a beginning English learner, the boy enjoys listening to chants and songs that frequently repeat English phonemes and the phonemes in the context of simple English words. After a few days, the boy tries an interactive book with text and voiceover in English. He learns quickly because the English voiceover is synchronized with images and text highlighting so the boy can connect sounds with words and concepts.

Example 2

Referring to the family in Example 1, the boy's parents observe his daily English studies intently. Because they do not speak or understand much English themselves, they decide to use a software module for translation of the text and voiceover in the learning activities of the environment from English to Mandarin. They download a mobile application associated with the language immersion teaching environment from an online application store and install it onto an Apple® iPhone®. The mobile application communicates with the web application and allows them to listen to the content and instructions of each activity in which the boy participates. The boy's parents form a favorable opinion of the boy's English studies.

Example 3

Referring to the boy in Example 2, after several days of play and experimentation, he decides to try pronouncing English words. The boy uses a software module that is integrated into the GUI of each learning activity to record his voice and compare it to model pronunciations of each word used. The boy clicks to play one of his favorite interactive books. He has watched and listened to the book several times, but this time, he clicks a record button, which activates a recording module that accesses the microphone on his Microsoft Windows laptop. They boy finds it fun to record his voice, listen to his words, and then immediately click a button to compare his voice to that of a native English speaker pronouncing each word.

Example 4

Referring to the family in Example 3, the boy's parents observe that he is spending more time with the English learning activities and the activities have begun to demonstrate sentences and even conversations. After 4 weeks, the boy's parents decide to consult a software module for monitoring his progress and performance. The software module is a separate standalone application that they install on their private desktop computer that is not available to their child. The standalone application communicates with the web application and generates a report. They see that their son has completed 43 activities, some more than 6 times each. They can also see from the report that the boy has achieved 76% of the educational objectives in the first of four English learning units, which is 12% of the overall instructional plan.

What is claimed is:

1. A computer-based language immersion teaching system comprising:
    (a) a digital processing device comprising a memory and an operating system configured to perform executable instructions; and
    (b) a computer program, provided to the digital processing device, including executable instructions that create a language immersion teaching environment, wherein the environment comprises a plurality of learning activities associated with a target language; wherein the language immersion teaching environment and the plurality of learning activities are suitable for a learner aged about 3 to about 10 years; wherein the plurality of activities comprises:
        i. at least one learning activity based on a taxonomy of phonemes;
        ii. at least one learning activity selected from: songs, chants, books, poems, puzzles, games, art activities, and printable activities;
        iii. voiceover audio in the target language; and
        iv. a software module for recording the learner's pronunciation and comparing it to one or more model pronunciations.

2. The computer-based system of claim 1, wherein the learning activities are organized according to an instructional plan based on a taxonomy of phonemes of the target language, wherein the instructional plan is designed to accomplish one or more specific educational objectives in the target language.

3. The computer-based system of claim 2, wherein the organization creates a progression of educational objectives comprising teaching phoneme sounds, phoneme sounds in the context of the beginning, middle, and end of words, word families, vocabulary in the context of environments or themes, sentence structures, and common conversational patterns.

4. The computer-based system of claim 1, wherein the target language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, Javanese, and Tagalog.

5. The computer-based system of claim 4, wherein the target language is English.

6. The computer-based system of claim 1, wherein the taxonomy of phonemes includes phonemes represented by a single letter and phonemes represented by one or more combinations of letters.

7. The computer-based system of claim 1, wherein the taxonomy of phonemes includes phonemes represented by an image.

8. The computer-based system of claim 1, wherein the plurality of activities includes activities designed to accomplish one or more educational objectives related to teaching sounds of phonemes and teaching phonemes in the context of the beginning, middle, and end of words.

9. The computer-based system of claim 1, wherein the plurality of activities includes activities designed to accomplish one or more educational objectives related to teaching one or more word families.

10. The computer-based system of claim 1, wherein the plurality of activities includes activities designed to accomplish one or more educational objectives related to teaching vocabulary in the context of a particular environment or theme.

11. The computer-based system of claim 1, wherein the plurality of activities includes activities designed to accomplish one or more educational objectives related to teaching sentence structures and common conversational patterns.

12. The computer-based system of claim 1, wherein the software module for recording the learner's pronunciation and comparing it to one or more model pronunciations is configured to provide visual feedback in the form of waveform analysis.

13. The computer-based system of claim 1, wherein the software module for recording the learner's pronunciation and comparing it to one or more model pronunciations is configured to provide feedback in the form of a pronunciation score.

14. The computer-based system of claim 1, further comprising a software module for translation of voiceover, text, or voiceover and text from the target language to a specified language.

15. The computer-based system of claim 14, wherein said software module for translation of voiceover, text, or voiceover and text is adapted to facilitate a mentor in furthering the educational development of the learner.

16. The computer-based system of claim 15, wherein access to the software module for providing translation of voiceover, text, or voiceover and text is regulated by the mentor.

17. The computer-based system of claim 15, wherein the specified language is selected by the mentor.

18. The computer-based system of claim 1, further comprising a software module for monitoring the progress of the learner, wherein the module reports one or more of: activities completed, educational objectives achieved, and progress within the overall instructional plan.

19. Non-transitory computer readable media encoded with a computer program including instructions executable by the operating system of a digital processing device, wherein the instructions create a language immersion teaching environment, wherein the environment comprises a plurality of learning activities associated with a target language; wherein the language immersion teaching environment and the plurality of learning activities are suitable for a learner aged about 3 to about 10 years; wherein the plurality of activities comprises:
 (a) at least one learning activity based on a taxonomy of phonemes;
 (b) at least one learning activity selected from: songs, chants, books, poems, puzzles, games, art activities, and printable activities;
 (c) voiceover audio in the target language; and
 (d) a software module for recording the learner's pronunciation and comparing it to one or more model pronunciations.

20. A computer-implemented language immersion teaching method comprising the step of providing executable instructions to a digital processing device comprising a memory and an operating system configured to perform executable instructions, to create a language immersion teaching environment, wherein the environment comprises:
 (a) a plurality of learning activities associated with a target language, wherein at least one learning activity is based on a taxonomy of phonemes, wherein at least one learning activity selected from: songs, chants, books, poems, puzzles, games, art activities, and printable activities;
 (b) an instructional plan organizing the activities, wherein the organization creates a progression of educational objectives comprising teaching phoneme sounds, phonemes in the context of the beginning, middle, and end of words, word families, vocabulary in the context of environments or themes, sentence structures, and common conversational patterns;
 (c) voiceover audio in the target language; and
 (d) a software module for recording a learner's pronunciation and comparing it to one or more model pronunciations;
provided that the language immersion teaching environment, the plurality of learning activities, and the educational objectives are suitable for the learner, the learner aged about 3 to about 10 years.

* * * * *